Dec. 18, 1923. 1,477,851
V. A. ROOT
MULTIPLE SPINDLE DRILL
Filed April 27, 1921    3 Sheets-Sheet 2

INVENTOR
VIRGIL A. ROOT
BY
ATTORNEY

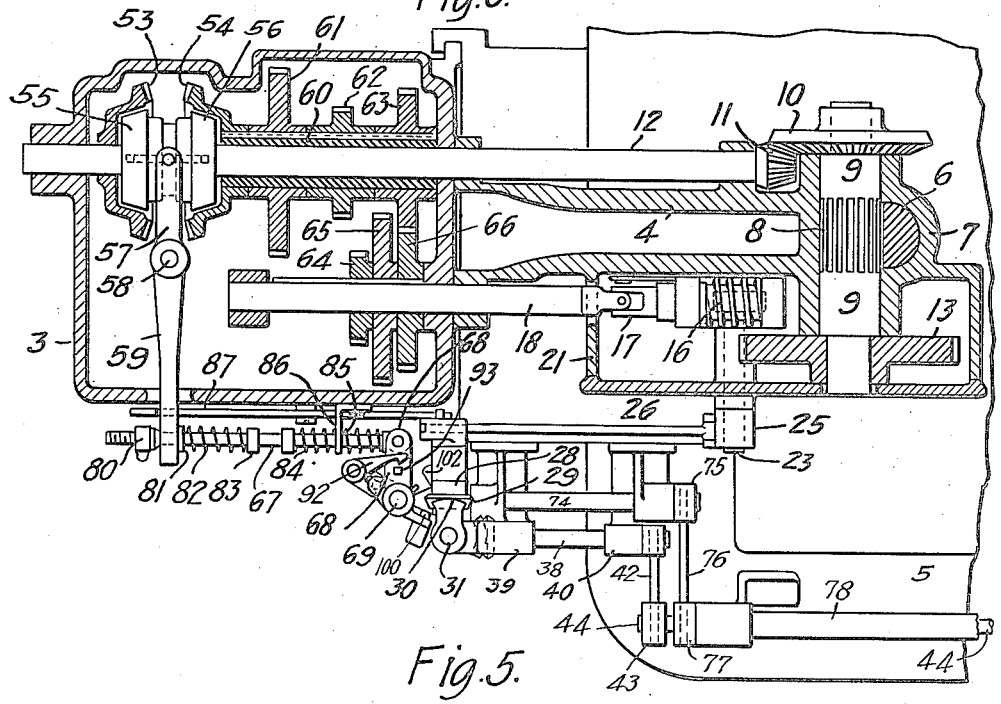

Patented Dec. 18, 1923.

1,477,851

UNITED STATES PATENT OFFICE.

VIRGIL A. ROOT, OF SPRINGFIELD, MASSACHUSETTS, ASSIGNOR TO BAUSH MACHINE TOOL COMPANY, A CORPORATION OF MASSACHUSETTS.

MULTIPLE-SPINDLE DRILL.

Application filed April 27, 1921. Serial No. 464,930.

*To all whom it may concern:*

Be it known that I, VIRGIL A. ROOT, a citizen of the United States, residing in Springfield, Massachusetts, have invented certain new and useful Improvements in Multiple-Spindle Drills, of which the following is a specification.

This invention aims to provide certain improvements in multiple spindle drills and similar machines.

The accompanying drawings illustrate a machine embodying the invention.

Fig. 3 is a horizontal section through the head of the machine illustrating the principal parts of the feed mechanism in plan;

Fig. 4 is a horizontal section on the line 4—4 of Fig. 2;

Fig. 5 is a side elevation of a detail of Fig. 3;

Fig. 6 is a section of Fig. 2 on the line 6—6;

Fig. 7 is a plan of the parts shown in Fig. 6.

Figs. 8 and 9 are elevations similar to Fig. 1 illustrating modifications.

Figure 1:
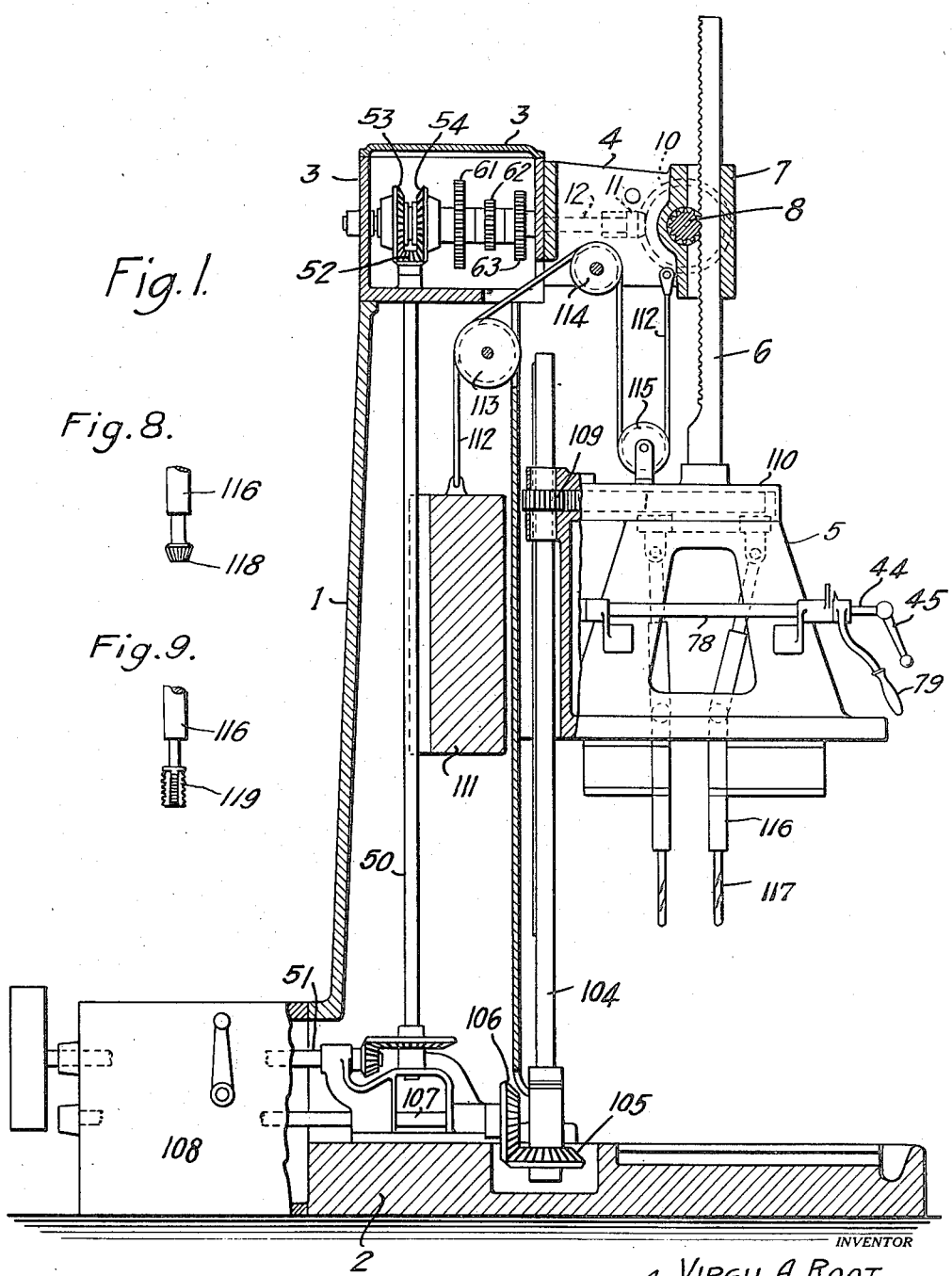
Fig. 1 is a vertical section with certain parts in elevation.

Referring to the embodiment of the invention illustrated, the supporting column 1 rests on a base 2 and has a head 3 with a forward extension 4. The head 5 is guided vertically on the face of the column and carries a number of adjustable spindles 116 which carry drills 117 designed to operate on the work which rests on the base 2. The head is advanced, that is lowered, rapidly until the drills are approximately in contact with the work and is then fed more slowly and under sufficient pressure through the work as the drills are rotated. When the drilling operation is completed the head is returned rapidly to its elevated position.

The head is suspended by means of rack 6 extending upward from a point substantially at the center of the spindles so as to exert an even pressure thereon during the feed. The rack passes up through a guide 7 on the forward end of the extension 4 and is engaged by a pinion 8 on a pinion shaft 9 in bearings in the end of said extension. On the rear end of the shaft 9 is a beveled gear 10 engaged by a pinion 11 on the shaft 12 which produces the comparatively quick advance and return of the spindle head. The shaft 9 carries at its opposite end a spur gear 13 driven by a pinion 14 on the hub of a worm gear 15 which is driven from a worm 16 connected by a universal joint 17 to a shaft 18 which is used to produce the forcible slow feed of the drills through the work.

Figure 2:
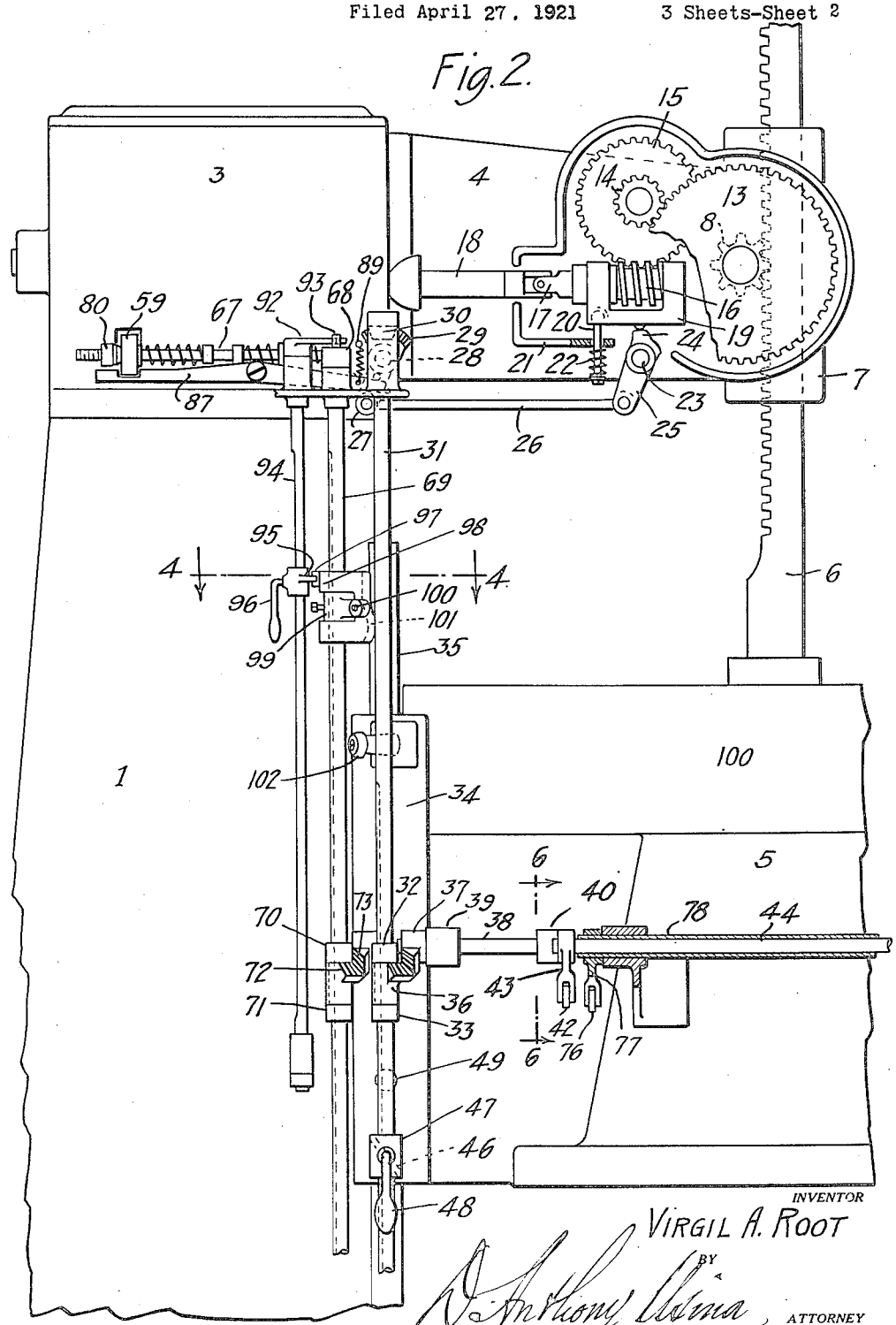
Fig. 2 is a side elevation, partly broken away of the feed control.

The worm 16 is carried in a frame 19 from which depends a pivoted pin 20 passing through a part of the casing 21 which surrounds this gearing, and having a spring 22 tending to pull the worm down and out of engagement with its gear 15. Below the worm is a transverse shaft 23 with a cam 24 on its inner end adapted to engage a boss on the underside of the frame 19 and to force the latter and the worm up to engaging position, as in Fig. 2 or, when the shaft is rocked, to permit the worm to drop down out of engagement; it being necessary to disengage the worm when the spindle head is to be advanced or retracted quickly. The shaft 23 is rocked through an arm 25 on its outer end and a link 26 extending rearwardly from said arm.

The link 26 at its rear end is connected to an arm 27 on a short shaft 28 which carries a beveled toothed segment 29 engaging a similar beveled segment 30 on the upper end of a shaft 31 which extends upward along the side of the column 1. This shaft passes through bearings 32 and 33 mounted on the side portion 34 of the head which is guided on suitable ribs 35 of the column, as indicated in Fig. 4. Between the bearings 32 and 33 is supported a beveled segment 36 which is splined on the shaft and moves up and down with the head of the machine. The segment 36 may be rocked by means of an engaging segment 37 on a shaft 38 mounted in bearings 39 and 40 on the side of the machine head. At its forward end the shaft 38 carries an arm 41 (Fig. 6) connected by a link 42 with an arm 43, Figs. 2 and 6, which is fixed on the end of a feed control shaft 44 which extends beyond the front of the head and has a handle 45 (Fig. 1). At the top of the travel of the head, the handle 45 and shaft 44 will be turned in a direction to disconnect the worm, and the head will be advanced quickly to drilling position. In this position the handle 45 will be turned in the opposite direction and the worm will be brought into operation to produce the slow feed through the work. At the end of the operation the handle 45 will again be turned to disconnect the worm and permit the quick return. Preferably, however, I arrange an automatic device for throwing out the worm at the end of a drilling operation. This automatic device consists of a cam 46 on the rear side of a sleeve 47 which by means of a handle 48 is clamped at any desired point on the shaft 31. On the part 34 of the head there is set a pin 49 which as the head reaches the lowest point desired will strike the cam 46 and turn the shaft 31 in a direction to throw out the worm.

The shafts 12 and 18 are driven from a vertical shaft 50 running up through the column 1 and driven at its lower end from a cross-shaft 51 and the usual means for starting, stopping and speed control. At its upper end the shaft 51 carries a bevel pinion 52 in continuous engagement with a pair of bevel gears 53 and 54 which are free to rotate on the cross-shaft 12 and which can be alternatively clutched to the latter to drive it in opposite directions, by means of friction drums 55 and 56 carried on a clutch ring which is splined on the shaft and shifted to one direction or the other by means of a fork 57 of the usual style mounted on a transverse shaft 58 which is rocked by means of an arm 59 projecting out beyond the side of the casing 3 at the top of the column for engagement with certain controlling devices hereinafter described.

The gear 54 is keyed directly on a sleeve 60 which turns freely on the shaft 12 when the gear is not clutched to this shaft. The sleeve 60 carries certain change speed gears keyed thereon, 61, 62 and 63. The feed shaft 18 carries corresponding pinions 64, 65 and 66 splined on the shaft and adapted to be shifted by any usual or suitable means (not illustrated) so as to bring them into engagement with different gears on the sleeve 60 when it is desired to secure a change of speed of the feed worm. The feed shaft 18 is thus driven continuously from the gear 54.

The clutch lever 59 is operated by means of a link 67 passing through the outer end of the lever and attached at the opposite end to an arm 68 on the upper end of a shaft 69 which extends down the side of the column parallel to the shaft 31 (Fig. 2) and is mounted in bearings 70 and 71 carried on the part 34 of the spindle head. Between these bearings is a beveled segment 72 splined on the shaft and engaging a similar segment 73 on the end of a shaft 74 (Fig. 6), which has a depending arm 75 connected by a link 76 to an arm 77 (Fig. 2) fixed on a sleeve or hollow shaft 78, which surrounds the shaft 44 and has at its outer end a hand lever 79 (Fig. 1) by which it can be rocked to the right or left in order to throw the clutch in one direction or the other to secure a fast travel downward or upward. The down travel is obtained by throwing the clutch cone 55 into engagement with the gear 53, the adjustable nut 80 on the end of the link 67 throwing the end of the arm 59 to the right in Fig. 3. The up travel is obtained by throwing the link 67 to the left. The link carries a sleeve 81 which is held against the clutch lever by a spring 82 reacting against a stop 83 set at a fixed point on the link. The spring thus tends to throw the clutch to the up travel position, but without effect as long as the worm gear is in mesh for feeding the spindles through the work, the clutch lever being locked during this time as hereinafter described. When the worm is dropped out of gear the clutch lever is unlocked and the spring throws it to the up travel position to move the spindle head up quickly. When the link 67 is not positively thrown in either direction it is held in a neutral position by equalizing springs 84 and 85 bearing against suitable stops on the link and bearing at an intermediate point on a projection 86 fastened on the side of the column head 3.

The clutch lever is locked during a feeding movement of the spindles through the work by means of a lever 87 pivoted on the side of the column head and having a beveled end in position to be engaged by a pin 88 on the lever 27 which is connected by a link 26 to the worm-controlling cam 24. When the arm 27 moves to the right (Fig. 5) it releases the lever 87 and the latter is pulled up by a spring 89 and its notch 90 moves clear below the clutch lever 59, a stop pin 91 limiting the upward movement of the lever. The worm is dropped out of gear and the fast travel clutch may be operated in either direction. When the arm 27 moves to the left the pin 88 forces down the beveled end of the lever 87 and causes the notch 90 to lock the clutch lever 59, the latter being at this time held in its neutral position by the equalizing springs. The operator first throws out the downward fast travel clutch, before throwing in the feed worm. If he should fail to do so the lever 59 would prevent the notched end of the lever 87 from rising and the pin 88, engaging the opposite end of the lever 87, would stop the movement of the arm 27 so that the operator would realize that he had still to throw out the fast travel.

For securing the up travel by hand the operator may hold the hand lever in proper position in order to prevent the equalizing springs from returning the clutch to neutral. For securing an automatic action, however, I have provided a latch 92 adapted to engage a projection 93 on the arm 68 and to hold the latter in the left hand or up travel position. The latch 92 is on the upper end of a shaft 94 mounted in bearings at the side of the column and carrying a fork 95 clamped thereon at any desired height by means of a hand screw 96. See Figs. 2 and 4. The fork 95 engages a pin on an arm 97 projecting from a sleeve 98. This sleeve has a pair of arms turning freely on the shaft and embracing a sleeve 99 which is fastened on the shaft by a set screw and which carries a spring plunger 100 pressing against a cam arm 101 projecting from the sleeve 98 and lying in the path of the roller 102 fixed at a determined height on the part 34 of the traveling spindle head.

With this mechanism, the worm feed being thrown in, the fast travel lever may be thrown to the up position. The clutch will be locked by the lever 87 and the throwing of the fast travel lever will press the spring 82 against the clutch lever without immediate effect. The arm 68 which controls the clutch link will be caught by the latch 92 so as to hold the link to the left with the spring pressing against the clutch lever. When the spindle head reaches the end of its feeding movement and operates the cam 46 and the shaft 31 to trip the worm out of gear, the locking lever 87 will be released and withdrawn from the clutch lever and the spring 82 will throw the latter to the up travel position. The spindle head will then travel upward until the roller 102 strikes the cam 101 and presses back the plunger 100 to turn the sleeve 98 and the arm 97 and the fork 95, which turns the shaft 94 and throws the latch 92 back, unlatching the operating arm of the link 67 and permitting the equalizing springs to bring the clutch lever to the neutral position. It will be understood that the plunger 100 and its spring 103 cause the latch 92 to spring against the pin 93 so as to hold the arm 68 in the operative position until the latch is withdrawn in the manner above described.

The operation of drilling, after the machine is in operation, the spindles rotating and the proper fast travel gear in mesh and the drills nearly engaging the work, is to throw the fast travel clutch to neutral and throw in the feed lever, which forces the drills through the work at a slow speed. The fast travel lever is then thrown to the opposite, or up, position. When the drilling is completed, the feed is automatically tripped and the clutch automatically thrown to produce a fast travel up and the head returns quickly to its elevated position, where the machine is ready for a second operation by throwing in the clutch for a fast travel downward. The automatic features may be omitted and the several operations controlled entirely by the hand levers. The machine may also be provided with any usual or suitable mechanism for adapting it to a counterboring or to a tapping operation. In the latter case particularly it is necessary to slow down the speed of the spindles and to provide means for quickly stopping, starting and reversing them. Fig. 8 shows a counterboring tool 118 set in one of the spindles 116 and Fig. 9 shows a tap 119 in the spindle 116.

The machine illustrated includes also a simple mechanism for driving, that is rotating, the spindles carried in the traveling head, transmitting the power thereto directly from a single shaft extending upward from the base of the machine; and the suspending of the spindle head in the manner above described facilitates this arrangement of the spindle drive. Referring to Fig. 1, there is a shaft 104 extending upward along the front of the column, between it and the principal parts of the traveling head, and carrying at its lower end a bevel pinion 105 driven from a similar pinion 106 on a cross-shaft 107 driven from the main source of power and preferably through intermediate change speed mechanism of any usual or suitable design carried in the casing 108 (and not illustrated in detail) by means of which the drills can be rotated at different rates of speed.

The shaft 104 slides through bearings projecting rearwardly from the top of the spindle carrying head 5, between which bearings in a pinion 109 splined on the shaft so as to travel up and down with the head. The pinion 109 drives the usual set of pinions in the cap 110 of the traveling head from which gearing in turn the spindles 116 are rotated. The shaft 104 has no supporting bracket except at its lower end.

The spindle head is counterbalanced by means of a weight 111 guided in the column 1 and suspended by a cable 112 which passes over fixed guide pulleys 113 and 114 carried by the column and by the extension 4 respectively, and thence over a pulley 115 fastened to the top of the traveling head, and is made fast at its opposite end to a part of the extension 4 of the head of the column. The pulley 115 is arranged approximately over the center of gravity of the traveling head 5 and connected parts, so that the pull upward of the counterweight on the traveling head is approximately or substantially in line with the downward pull of gravity. By this arrangement the head will be made to slide easily and without any cramping action of the ways or guides through which it engages the column. The pulley 115 being engaged by the bight of the cable makes it possible to use a weight 111 which is only one-half that of the head, thus economizing space as well as cost. The travel of the weight will, of course, be twice as great as that of the head, but there is sufficient room in the height of the column for such travel, compared with the maximum travel of the spindle head.

The most important improvement in this machine is the feeding of the head by the rack which is located approximately in line with the center of the drill pressure. When there are a number of drills in operation there is a tremendous upward reaction of the head which in previous machines throws the head out of line and cramps its ways or guides on the column and renders the operation unsteady. The most common construction in previous machines has involved a pinion on the rear side of the head engaging a rack on the face of the column and applying the downward pressure far to the side of the center of the drill pressure. In some constructions a screw has been used over the center of the head for feeding, but this does not adapt itself readily to a satisfactory quick approach and return nor to such operations as counterboring and tapping. By my design I secure these operations through a comparatively simple type of gearing and at the same time secure a substantially uniform pressure on all the drills so as to ensure an easy and smooth feed. The substantially perfect balance of the head eliminates cramping stresses due to the weight of the parts, and leaves it to the feed mechanism to take care of the pressures and reactions due to the drilling operations; the two features together giving a very smooth operation with a feed and travel mechanism which are well adapted to all uses of the machine.

The improvements described are applicable to counterboring, tapping and various other operations, not strictly called drilling, for which machines of this type are sometimes used; and, with the exception of the counterweighting mechanism, are applicable equally well to both horizontal and vertical machines; and also to machines having more than one spindle-carrying head.

Though I have described with great particularity of detail a machine embodying my invention yet it is not to be understood therefrom that the invention is restricted to the particular embodiment described. Various modifications thereof in detail and in the arrangement of the parts may be made by those skilled in the art without departure from the invention as defined in the following claims.

What I claim is—

1. A multiple spindle drilling machine having a head carrying a number of spindles and having lateral means for guiding said head in a direction parallel to the spindles, a rack directly connected to said head at a point substantially or approximately in line with the center of pressure of the several drills and a pinion directly engaging said rack for feeding said head, fast travel gearing engaging said pinion for retracting and advancing said head and slow feed gearing engaging said pinion for feeding the head to force the spindles through the work.

2. A multiple spindle drilling machine having a head carrying a number of spindles and having lateral means for guiding said head in a direction parallel to the spindles, a rack for supporting and feeding said head by a pressure substantially or approximately in line with the center of pressure of the several drills, toothed gearing for retracting and advancing the head quickly and worm gearing for feeding the head slowly to force the drills through the work.

3. A multiple spindle drilling machine having a spindle-carrying head guided to travel vertically, a rack from which said head is supported, a pinion engaging said rack, slow gearing including a worm for driving said pinion and fast gearing independent of said worm for driving said pinion.

In witness whereof, I have hereunto signed my name.

VIRGIL A. ROOT.